United States Patent [19]
Webb

[11] Patent Number: 4,786,129
[45] Date of Patent: Nov. 22, 1988

[54] OPTICAL COUPLING ASSEMBLY

[75] Inventor: Roderick Webb, Woodbridge, England

[73] Assignee: British Telecommuncations, London, England

[21] Appl. No.: 14,050

[22] PCT Filed: Jun. 18, 1986

[86] PCT No.: PCT/GB86/00352
§ 371 Date: Feb. 18, 1987
§ 102(e) Date: Feb. 18, 1987

[87] PCT Pub. No.: WO86/07642
PCT Pub. Date: Dec. 31, 1986

[30] Foreign Application Priority Data

Jun. 19, 1985 [GB] United Kingdom ............... 8515500
Jun. 19, 1985 [GB] United Kingdom ............... 8515583

[51] Int. Cl.[4] ............................................. G02B 6/26
[52] U.S. Cl. .................. 350/96.15; 350/354; 356/345
[58] Field of Search ............. 350/96.15, 96.16, 96.29, 350/354, 358; 372/6, 9, 33; 356/345, 349, 350, 352, 73.1

[56] References Cited

U.S. PATENT DOCUMENTS 3,691,387  9/1972  DeLange ........................... 250/199
3,908,121  9/1975  Riseberg et al. .................. 250/199
4,552,457  11/1985  Giallorenzi et al. .............. 356/345

FOREIGN PATENT DOCUMENTS 143561  6/1985  European Pat. Off. .

OTHER PUBLICATIONS

Wyatt et al., Electronics Letters, vol. 19, No. 14, 7 Jul. 1983, "1.52 μm PSK Heterodyne Experiment Featuring an External Cavity Diode Laser Local Oscillator", pp. 550–551.
Kobayashi et al., Electronics Letters, vol. 18, No. 5, 4 Mar. 1982, "Optical Phase Modulation in an Injection Locked AlGaAs Semiconductor Laser", pp. 210–211.
Kist et al., Laser and Optoelectronic, vol. 16, No. 1, Feb. 1984, "Fiber and Integrated Optical Monomode Sensors: A Review", pp. 17–30.

Primary Examiner—William L. Sikes
Assistant Examiner—Frank González
Attorney, Agent, or Firm—Nixon & Vanderhye

[57] ABSTRACT

An optical coupling assembly is disclosed which comprises a semiconductor laser amplifier to which an optical control signal and an input signal are fed. The semiconductor laser amplifier is responsive to changes in amplitude of the control signal to produce corresponding phase shifts in the input signal. First and second optical couplers are positioned upstream and downstream of the laser amplifier so that a proportion of the input signal and control signal are fed along an optical fiber directly from the first optical coupler to the second coupler. The remaining portions of the input signal and control signal are fed to the laser amplifier where the input signal is phase shifted and then fed to the second coupler. The arrangement is such that the proportion of the input signal output from each output port of the second coupler is selectable by controlling the amplitude of the control signal.

12 Claims, 3 Drawing Sheets

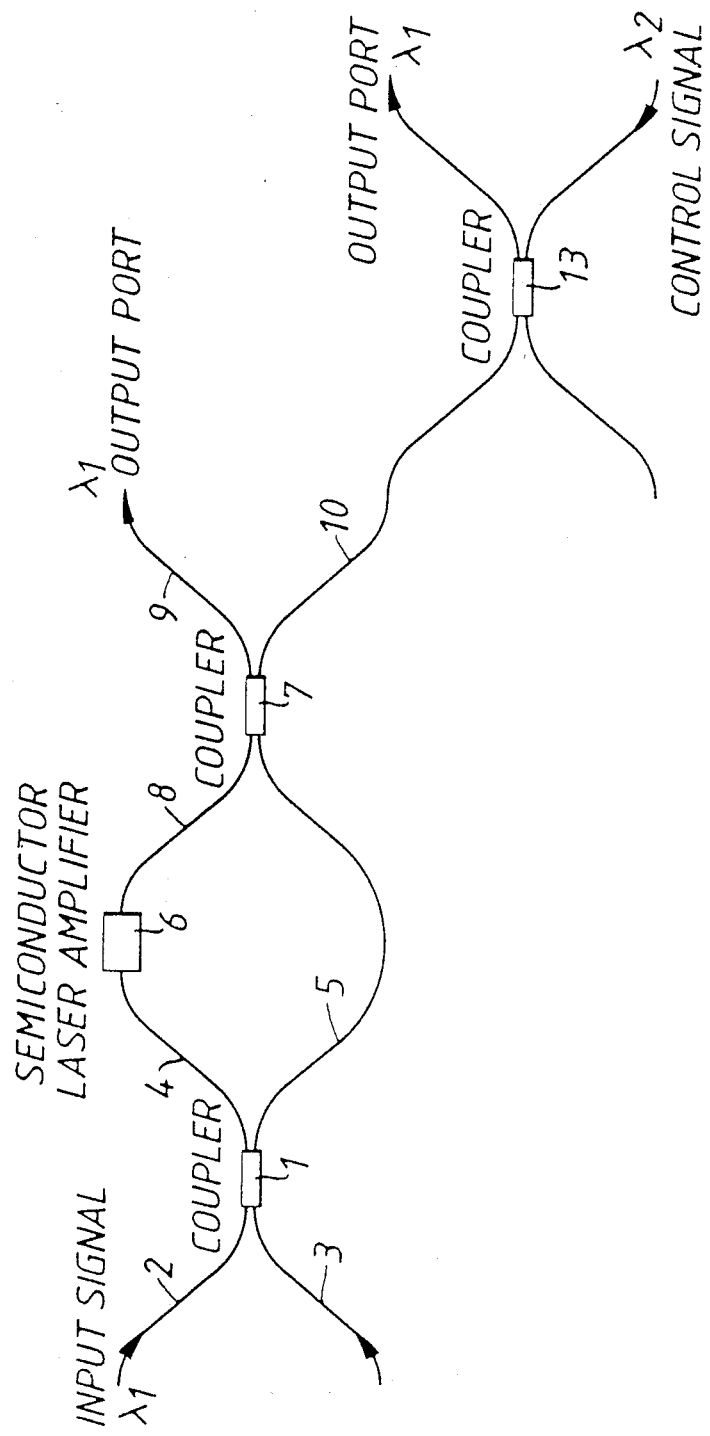

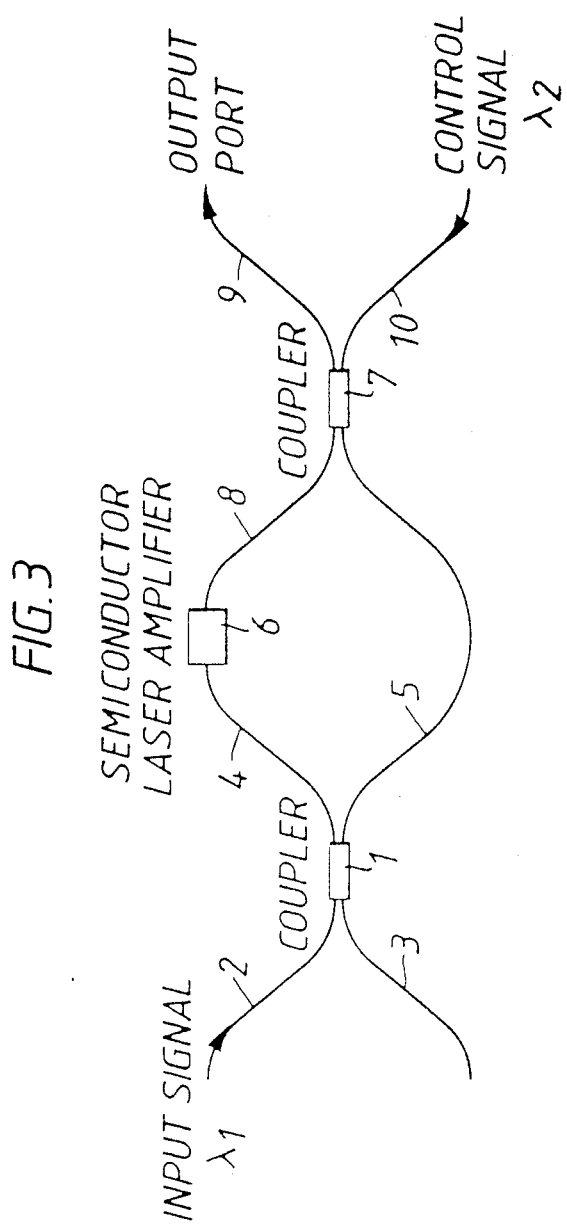

OPTICAL COUPLING ASSEMBLY

FIELD OF THE INVENTION

The invention relates to an optical coupling assembly for controlling the coupling of an input optical signal between an input port and a pair of output ports.

In accordance with one aspect of the present invention, an optical coupling assembly comprises a conversion device to which an optical control signal and an input signal are fed, the conversion device being responsive to changes in amplitude of the control signal to produce corresponding phase shifts in the input signal; and optical coupling means having two input ports and two outputs ports for coupling the phase shifted input signal from the conversion device with the input signal the arrangement being such that the proportion of the input signal output from each output port of the optical coupling means is selectable by controlling the amplitude of the control signal.

SUMMARY OF THE INVENTION

The invention provides a neat way in which to couple an optical input signal selectively with one of two output ports.

In one arrangement the control signal component could be separated from the phase shifted signal prior to the one coupling means by the insertion of suitable separation means in the signal path.

Preferably, the assembly includes additional optical coupling means having two input ports and two output ports, the two output ports being connected respectively with the conversion device and an input port of the one optical coupling means and the two input ports receiving, in use, the control signal and the input signal respectively.

In this case proportions of both the control signal and non-phase shifted input signal will be fed to the one coupling means. To deal with this, separation means could be inserted between the coupling means or downstream of the one coupling means to remove the control signal component if desired.

The conversion device is preferably provided by an optical device which has a refractive index which varies in accordance with the optical power of the optical control signal. This variation causes changes in the optical path length through the device. An example of a suitable conversion device is a semiconductor laser amplifier.

In accordance with a second aspect of the present invention, a method of operating an optical coupling assembly according to the one aspect of the invention comprises generating a control signal having one of two amplitudes, the power of the control signal being such that the input signal is substantially completely coupled with one of the two output ports of the one coupling means, the output port being selected in accordance with the amplitude of the control signal.

In this way, the optical coupling assembly is used as an optical switch.

Preferably, the control signal has a different wavelength from the input signal. This simplifies the filtering out of the control signal downstream of the optical coupling means which is necessary in certain applications.

In this specification, the term optical is intended to refer to that part of the electromagnetic spectrum which is generally known as the visible region together with those parts of the infra-red and ultra-violet regions at each end of the visible region which are capable of being transmitted by dielectric optical waveguides such as optical fibres.

BRIEF DESCRIPTION OF THE DRAWINGS

Some examples of optical switches in accordance with the present invention will now be described with reference to the accompanying drawings, in which:

FIG. 2 illustrates a second example of an optical coupling assembly in accordance with the present invention; and FIG. 3 illustrates a third example of an optical coupling assembly in accordance with the present invention.

DETAILED DESCRIPTION

Figure 1:
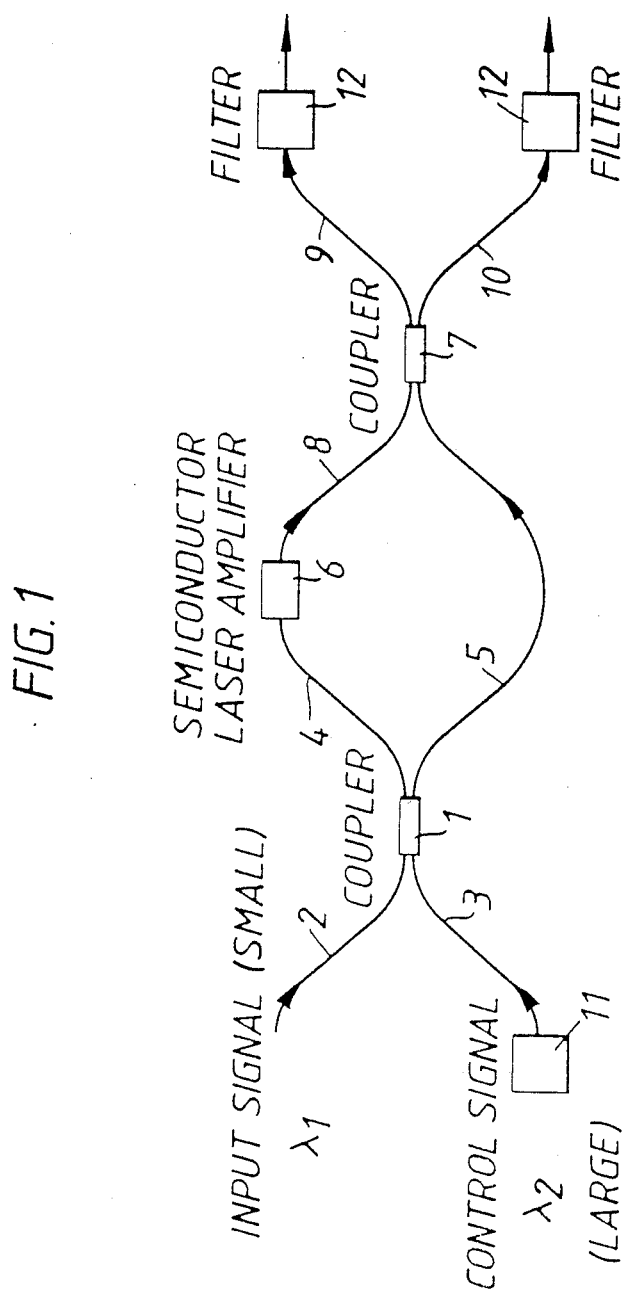
FIG. 1 illustrates a first example of an optical coupling assembly in accordance with the present invention.

The switch shown in FIG. 1 comprises a first optical fibre coupler 1 having two input ports defined by optical fibres 2, 3 and two output ports defined by optical fibres 4, 5. The optical fibre 4 is connected to a semiconductor laser amplifier 6. A second optical coupler 7 has a pair of input ports defined by the optical fibre 5 and an optical fibre 8 and a pair of output ports defined by optical fibres 9, 10. This arrangement constitutes a modified Mach-Zender interferometer.

The semiconductor laser amplifier exhibits certain optical non-linearities with incident light power. These include the fact that both the gain and the refractive index of the laser varies with incident light power. This latter non-linearity leads to changes in the optical path length through the laser amplifier, and hence changes in the signal transit time. These changes result in phase shifts of signals passing through the amplifier.

In use, an input signal which may be for example amplitude or phase modulated in accordance with information is fed along the optical fibre 2 to the coupler 1. In addition, a laser 11 generates a constant power control signal which has a larger amplitude relatively to the input signal. This control signal is fed to the coupler 1 along the optical fibre 3. At the coupler 1, the two incoming optical signals are combined and proportions of each signal are fed along the optical fibres 4, 5.

The laser amplifier 6 is responsive to the large amplitude control signal to cause corresponding phase shifts in the input signal. The amplitude of the control signal is controlled to take up one of two values which causes the laser amplifier 6 to impart one of two different phase shifts to the input signal output by the laser amplifier 6. This phase shifted signal combined with the control signal is fed along the optical fibre 8 to the coupler 7. In addition, a combination of the input signal and control signal is fed directly to the coupler 7 along the optical fibre 5.

If the two components input to the optical coupler 7 have powers in the correct ratio, then the original input signal on the optical fibres 2, 5 can be substantially completely coupled with either the optical fibre 9 or the optical fibre 10 depending upon which of the two amplitudes the original control signal has.

It will be appreciated that the optical coupler 7 will couple a proportion of the control signal into each of the optical fibres 9, 10. It is preferable therefore for filtering means 12 to be provided to remove the control signal component. This is most simply achieved if the control signal has a different wavelength from the input signal in which case the separation means 12 can comprise wavelength filters.

In the example shown in FIG. 1, the control signal is injected into the semiconductor laser amplifier 6 in the same direction as the input signal. FIG. 2 illustrates an alternative arrangement in which the control signal is fed to a third optical fibre coupler 13 which couples the control signal into the optical fibre 10 leading to the coupler 7. In this way, the control signal is injected into the semiconductor laser amplifier 6 in a direction opposite to the input signal. The use of the extra optical coupler 13 is important where the input signal may be desired on either of the optical fibre 9 or the optical fibre 10.

In a simpler arrangement shown in FIG. 3, the control signal is injected directly into the optical fibre 10 but in this case access is not required to the switched, input signal along the optical fibre 10.

The advantage of inserting the control signal in a direction opposite to the input signal is a reduction in the power of the amplified control signal emerging from the system with the switched signal, possibly making the use of filters unnecessary.

I claim:

1. An optical coupling assembly comprising:
   a first optical coupling means having a first and a second input port and a first and a second output port;
   a conversion means having an input, an output coupled to the first input of the first optical coupling means, and an optical path length which is dependent on the amplitude of an optical signal passing through it; and
   a splitting means couplable to a source of an optical input signal for coupling a first portion of the optical input signal to the input of the conversion means, and a second portion of the optical input signal to the second input of the first coupling means;
   whereby the proportion of the input signal output from each output port of the first optical coupling means is selectable by coupling an optical control signal of appropriate amplitude to the conversion means.

2. An assembly according to claim 1 wherein the splitting means comprises a second optical coupling means having a first and a second input port and a first and a second output port, the first output port being coupled to the input of the conversion means and the second output port being coupled to the second input of the first optical coupling means and the first and second input ports receiving in use the control signal and the input signal respectively.

3. An assembly according to claim 1 or claim 2, further comprising control signal separation means positioned downstream of each output port of the first optical coupling means to remove the control signal component.

4. An assembly according to claim 1 or claim 2, wherein the conversion means is provided by an optical device which has a refractive index which varies in accordance with the optical power of the optical control signal.

5. An assembly according to claims 1 or 2 further including control signal generating means arranged to generate a control signal having one of two predetermined amplitudes whereby the input signal is substantially completely coupled with one of the two output ports of the first optical coupling means, the output port being selected in accordance with the amplitude of the control signal.

6. An assembly according to claim 5 wherein the control signal generating means is arranged to generate a control signal having a different wavelength from the input signal.

7. In an optical assembly having a first optical coupling means having a first and a second input port and a first and a second output port, and a conversion means having an input, and an output coupled to the first input of the first optical coupling means, a method for operating said optical coupling assembly to couple an input optical signal to the first and second output ports comprising the steps of:
   inputting an optical input signal;
   splitting a first portion of said optical input signal and coupling said first portion to said conversion means wherein an optical path length is provided which is dependent upon the amplitude of the optical signal passing through it;
   splitting a second portion of said optical input signal and coupling said second portion to the second input of said first coupling means;
   generating a predetermined output signal at said first output port and said second output port; and
   controlling the proportion of the optical input signal output to said first output port and said second output port by coupling an optical control signal of an appropriate magnitude to said conversion means.

8. A method according to claim 7, wherein said splitting steps are performed by a second optical coupling means having a first and a second input port and a first and a second output port, the first output port being coupled to the input of the conversion means and the second output port being coupled to the second input of the first optical coupling means, said method further including the step of receiving the control signal at the first input port of said second optical coupling means and receiving the input signal at the second input port of said second optical coupling means.

9. A method according to claims 7 or 8 further including the step of removing the control signal component from signals emanating from said first optical coupling means.

10. A method according to claims 7 or 8 wherein said conversion means is an optical device which has a refractive index which varies in accordance with the optical power of the optical control signal.

11. A method according to claims 7 or 8 further including the step of generating an optical control signal having one of two predetermined amplitudes, whereby the optical input signal is substantially completely coupled with one of the two output ports of the first optical coupling means, the output port being selected in accordance with the amplitude of the control signal.

12. A method according to claim 11 wherein said step of generating an optical control signal includes the step of generating a control signal having a different wavelength from the input signal

* * * * *